(12) United States Patent
Bernard et al.

(10) Patent No.: US 6,705,206 B1
(45) Date of Patent: Mar. 16, 2004

(54) FLUID ACTUATOR ROTOR FOR HINGED VEHICLE SAFETY DEVICES

(75) Inventors: Edward Bernard, Maidstone (CA); Richard J. Iminski, St. Clair Shores, MI (US); Kevin L. Wolf, Macomb Township, MI (US)

(73) Assignee: Transpec, Inc., Sterling Heights, MI (US)

( * ) Notice: Subject to any disclaimer, the term of this patent is extended or adjusted under 35 U.S.C. 154(b) by 0 days.

(21) Appl. No.: 10/273,248

(22) Filed: Oct. 17, 2002

(51) Int. Cl.$^7$ ................................ F16J 1/10; F01B 9/00
(52) U.S. Cl. ........................................ 92/129; 92/130 B
(58) Field of Search ...................... 92/129, 140, 130 B, 92/128

(56) References Cited

U.S. PATENT DOCUMENTS

| | | |
|---|---|---|
| 5,357,239 A | 10/1994 | Lamparter |
| 5,719,553 A | 2/1998 | Lamparter |
| 6,435,075 B1 * | 8/2002 | Lamparter et al. ............ 92/129 |

* cited by examiner

Primary Examiner—Thomas E. Lazo
(74) Attorney, Agent, or Firm—Reising, Ethington, Barnes, Kisselle, P.C.

(57) ABSTRACT

A fluid actuator attaches a hinged safety device to a vehicle and pivots the hinged safety device between retracted and extended positions. The housing of the actuator has a base and a removable cover. A sub-assembly is attached to the base. The subassembly includes a generally planar base member with integral right cylinder, lever arm pivot support and stop posts. A piston slides in the right cylinder and forms a fluid chamber between the piston and a closed end of the right cylinder that is fed through a passage through the closed end of the cylinder. A lever arm is pivotally attached to the lever arm pivot support at one end for pivotal movement between retracted and extended positions, the lever arm extending over the cylinder and having a lip at an opposite end that is spaced from the right cylinder. A pivot arm engages the top of the piston at one end and the lever arm at an opposite end to transfer motion from the piston to the lever arm. The lever arm transfers motion to a rotor that is rotationally mounted in the housing for movement between retracted and extended positions. The rotor has a spool at each end and an eccentric arm between the spools at the respective ends of the rotor that engages the lip of the lever arm. A torsion spring encircles each spool with one end engaging the rotor and an opposite end engaging a stop post so that the eccentric arm is biased against the lip of the lever arm and the rotor and the lever arm are biased to their respective retracted positions. The rotor and torsion springs are formed into a pre-assembled unit for the sub-assembly by preload spring clips.

11 Claims, 3 Drawing Sheets

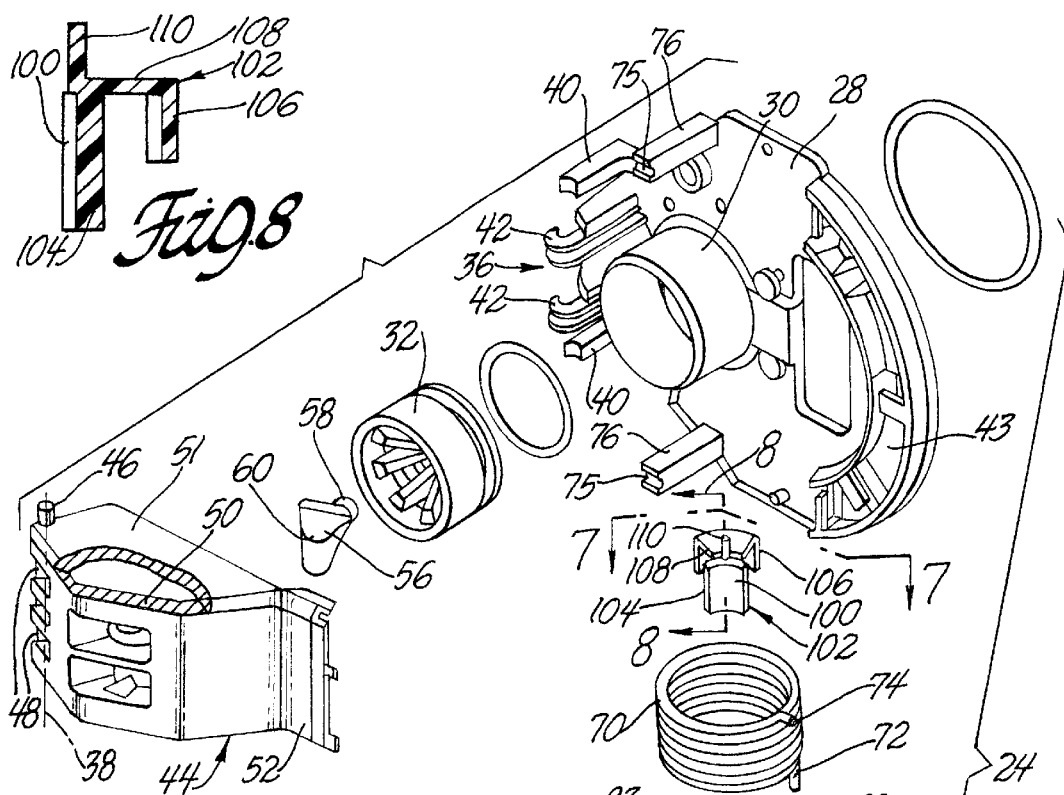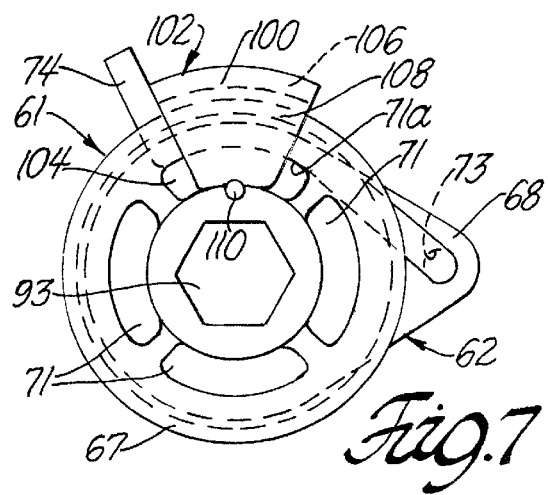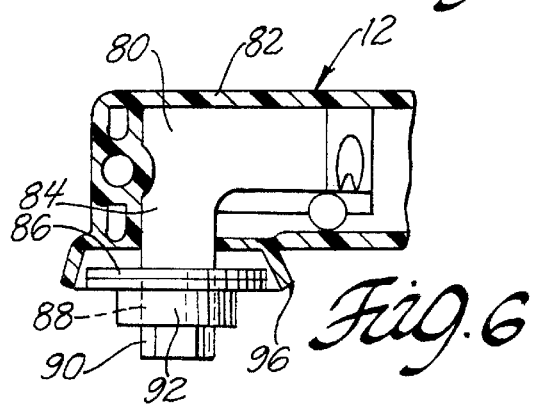

FLUID ACTUATOR ROTOR FOR HINGED VEHICLE SAFETY DEVICES

FIELD OF THE INVENTION

This invention relates hinged vehicle safety devices and more particularly to actuators for hinged vehicle safety devices.

BACKGROUND OF THE INVENTION

U.S. Pat. No. 5,357,239 granted to Ronald C. Lamparter Oct. 18, 1994 discloses an actuating device for operating a safety unit, such as a crossing arm or a stop sign, that moves between a retracted position adjacent the vehicle and an extended position extending outwardly from the vehicle. A housing is mounted on the vehicle and a bracket is pivotally mounted on the housing for movement about a vertical pivot axis between a retracted position and an extended position. The actuating device includes a drive mechanism having a drive unit for pivoting the bracket about the pivot axis and an electric motor for driving the drive unit.

U.S. Pat. No. 5,719,553 granted to Ronald C. Lamparter Feb. 17, 1998 discloses a sealed actuator assembly for hinged vehicle safety devices, such as a crossing arm or a stop sign. The sealed actuator assembly is attached to the vehicle and includes the electrical and mechanical components that pivot the hinged safety device from a stored position adjacent the bus to an operative position extending outwardly of the bus. These components and wiring harnesses are protected in an outer sealed housing that has a removable cover to facilitate installation and repair. Installation and repair is further enhanced by a removable inner housing sub-assembly that carries a motor control circuit for the electric motor and provides additional protection for the electric motor.

The actuators described above are very satisfactory for their intended purpose. However, both actuators use an electric motor to pivot the vehicle safety device, which is fine because all vehicles include an electric storage battery for a power source. On the other hand, some vehicles and school busses in particular, normally include a fluid power source such as an air pump for operating other systems and accessories. The fluid power source may be preferred over the electrical power source for one reason or another. However, the fluid power source cannot operate the actuators described above.

Consequently, an actuator assembly for hinged vehicle safety devices, such as a fluid actuator assembly for hinged vehicle safety devise has been developed by Transpec, Inc., the assignee of the invention which is the subject of this patent application. The fluid actuator assembly, which is disclosed in pending U.S. patent application Ser. No. 09/798,149, now U.S. Pat. No. , 6,435,075, issued Aug. 20, 2002 has a housing with a fluid motor attached inside the housing. A lever arm is pivotally attached to the housing for pivotal movement by the fluid motor between retracted and extended positions. A rotor is rotationally mounted in the housing for movement between retracted and extended positions, the rotor having a spool at one end and an eccentric arm next to the spool that engages the lever arm. A torsion spring encircles the spool with one end engaging the rotor and an opposite end engaging a stop in the housing so that the eccentric arm is biased against the lever arm and the rotor and the lever arm are biased to their respective retracted positions. When pressurized fluid is admitted into the fluid motor, the fluid motor pivots the lever arm toward the extended position. The lever arm in turn rotates the rotor and the safety device attached to it toward the extended position.

The rotor preferably has a spool and a torsion spring at each end for balanced operation. The housing preferably has a base and a removable cover while several internal parts preferably form a sub-assembly to make assembly easier.

The fluid actuator assembly that Transpec, Inc. developed, is satisfactory for its intended purpose. However, the fluid actuator can be improved, particularly with regard to facilitating assembly of the rotor and torsion springs.

SUMMARY OF THE INVENTION

The fluid actuator assembly of this invention has a rotor unit that includes the torsion spring or springs, each of which are held in a preloaded condition by a preload spring clip. This rotor unit or sub-assembly results in an improved assembly process that is easier that the assembly process of the fluid actuator assembly described in the '149 patent application.

BRIEF DESCRIPTION OF THE DRAWING

The above and objects, features and advantages of the invention will become more apparent from the following description taken in conjunction with the accompanying drawings wherein like references refer to like parts and wherein:

FIG. 5 is an exploded perspective view of a sub-assembly of the fluid actuator that is shown in FIG. 2;

FIG. 6 is an enlargement of an encircled portion of the hinged stop sign that is shown at 6 in FIG. 2;

FIG. 7 is an end view of a rotor unit of the sub-assembly of FIG. 5 taken substantially along the line 7—7 looking in the direction of the arrows; and FIG. 8 is a section taken substantially along the line 8—8 of FIG. 5 looking in the direction of the arrows.

DESCRIPTION OF THE PREFERRED EMBODIMENT

Figure 1:
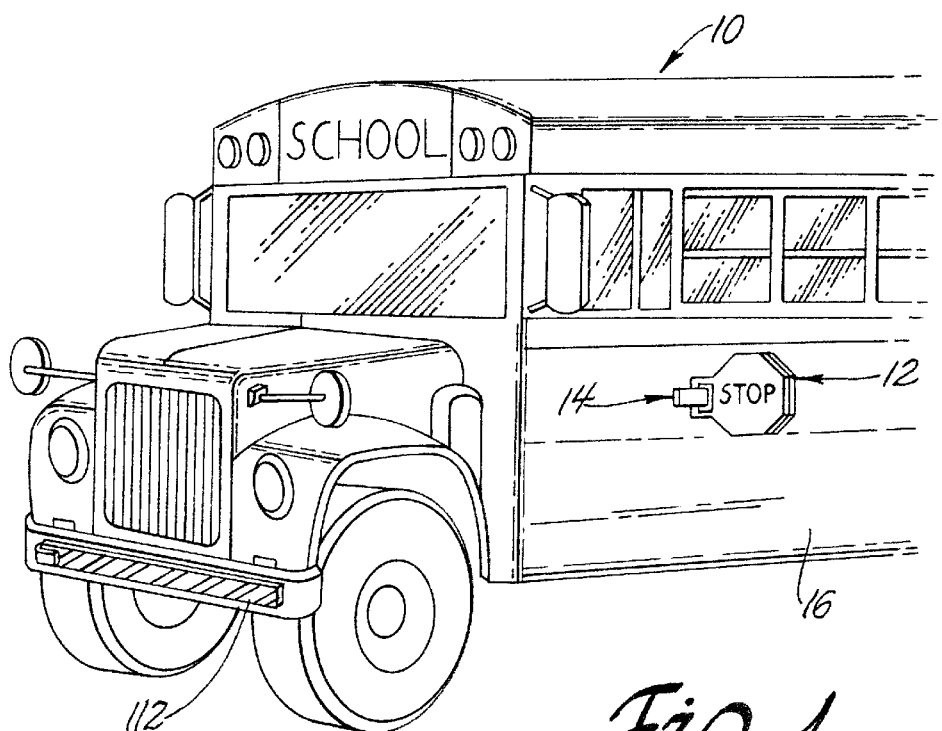
FIG. 1 is a perspective view of a school bus equipped with a hinged stop sign and a hinged crossing arm and a fluid actuator of the invention for pivoting the hinged stop sign and an identical assembly for pivoting the hinged crossing arm.

Referring now to the drawing, FIG. 1 shows a school bus 10 equipped with a hinged stop sign 12 and a fluid actuator 14 of the invention. Actuator 14 is attached to the body side panel 16 of the bus and pivots stop sign 14 between a stored or retracted position adjacent the body side panel 16 and an extended position where stop sign 12 is substantially perpendicular to the body side panel 16.

Figure 3:
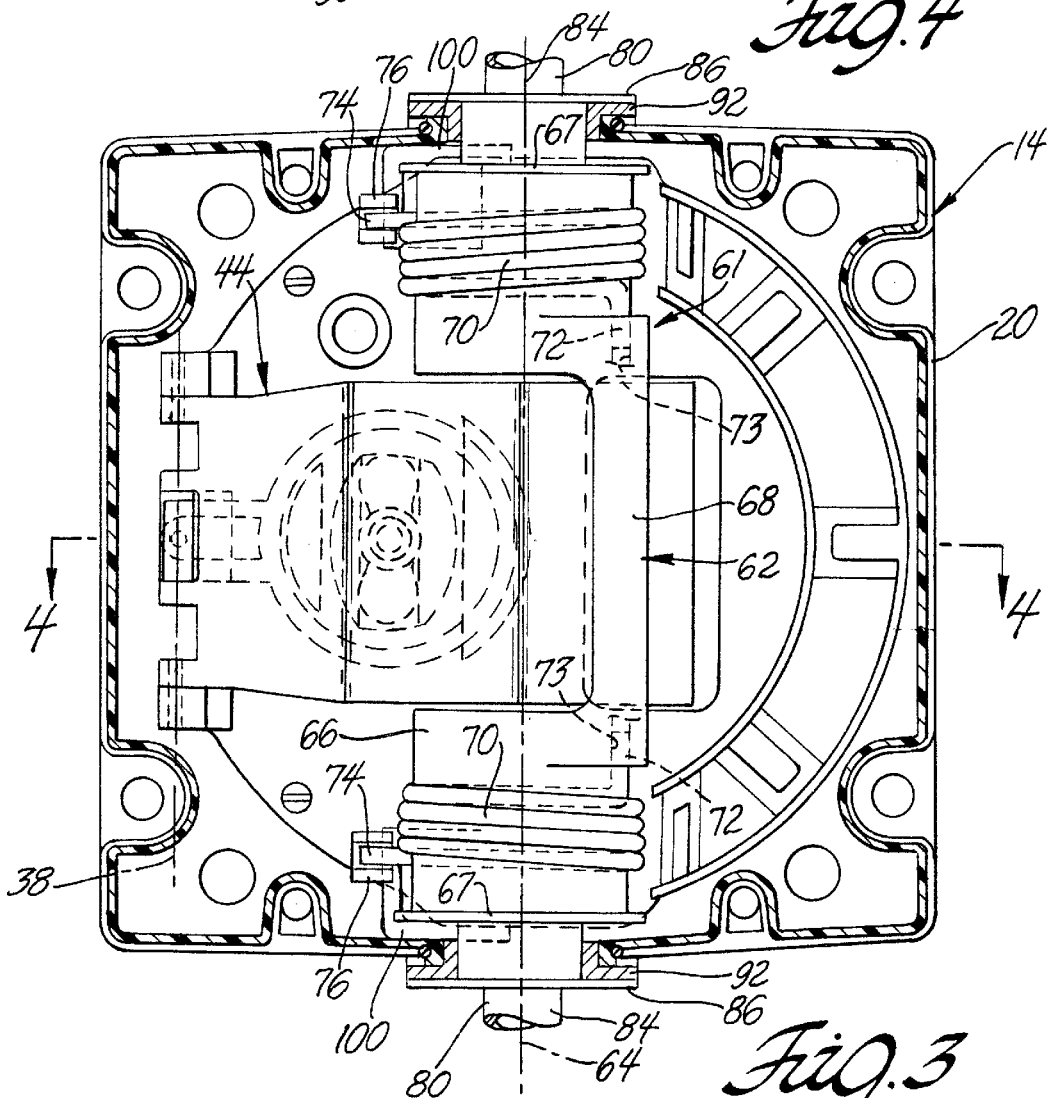
FIG. 3 is an enlarged from view of the fluid actuator of FIG. 2 with the cover removed to show internal detail.

Actuator 14 comprises a housing 18 that has a base 20 and a removable cover 22. Housing 18 is preferably sealed to protect internal components from the environment. The internal components are preferably formed into a subassembly 24 that is illustrated best in FIG. 5 and that is fastened to the bottom of base 20 by screws 26 when cover 22 is removed as shown in FIG. 3.

Subassembly 24 comprises a generally planar base member 28 that has a right cylinder 30 attached to it that forms part of a fluid motor 31. Cylinder 30 has a closed end at the base member and an open end spaced from the base member. Fluid motor 31 includes a piston 32 that slides in cylinder 30 and forms a fluid chamber 33 between the piston and the closed end of the cylinder that communicates with a fluid power source 98 via passage 34 that extends through the closed end of cylinder 30 and the bottom of base 20. Cylinder 30 is preferably an integral part of base member 28 for economy in which case passage 34 extends through base member 28.

The outer end surface of piston 32 has a concentric ball socket 35 with the ball socket 35 preferably located at the bottom of a deep cavity 37 in the outer end surface of piston 32 that converges to the ball socket 35. Cavity 37 cooperates in minimizing height requirements for housing 28 as explained below.

Base member 28 also has a lever arm pivot support 36 that is attached to it to define a pivot axis 38 that is spaced outwardly of cylinder 30 and that is substantially parallel to the generally planar base member 28. The lever arm pivot support 36 comprises laterally spaced supports 40 and a retainer 42 disposed between the laterally spaced supports 40. Supports 40 and retainer 42 are preferably an integral part of base member 28 for economy. Retainer 42 is also preferably integrally attached to cylinder 30 by an extension for increased strength. Base member 28 may also include a wiring channel 43 for wiring from the bus 10 that passes through housing 18 and into the hinged stop sign 12 or the hinged crossing arm assembly 112.

Figure 4:
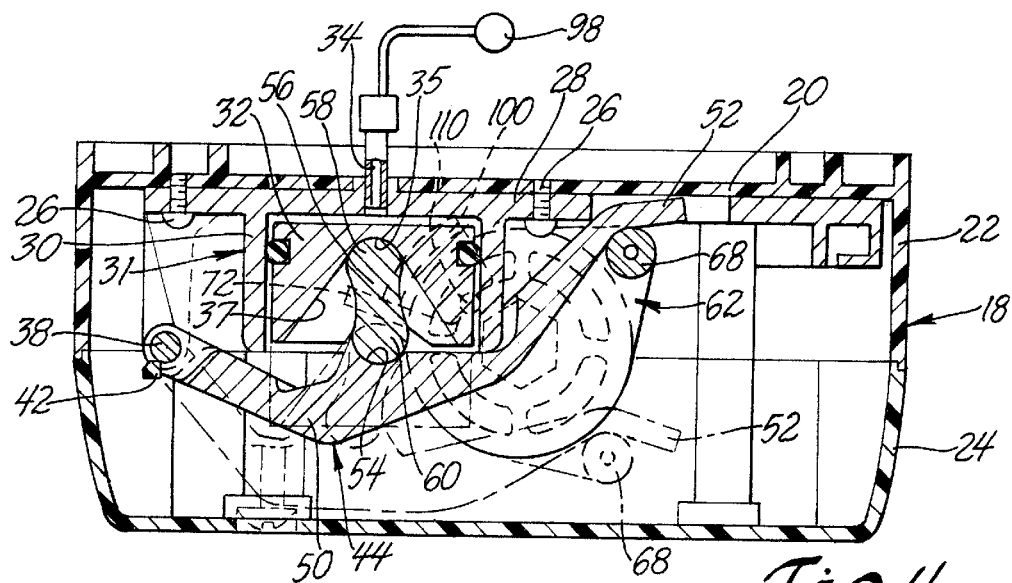
FIG. 4 is a section taken substantially along the line 4—4 of FIG. 3 looking in the direction of the arrows.

A lever arm 44 is pivotally attached to the lever arm pivot support 36 at one end so that the lever arm swings between a retracted position shown in solid line in FIG. 4 and an extended position shown in phantom line in FIG. 4. More specifically, lever arm 44 has laterally extending end pins 46 that nest in semi-cylindrical grooves in the tops of supports 40 and a concentric center pin portions 48 that fit under curved hooks at the top of retainers 42 to locate the four concentric pins on pivot axis 38. The end of lever arm 44 and pivot support 36 are resilient enough so that end pins 46 and center pin 48 can be snapped into place to facilitate assembly.

The pivotally attached lever arm 44 has a generally concavo-convex body 50 and side skirts 51 that fit over cylinder 30. Body 50 terminates in a lip 52 that is spaced from cylinder 30. The concave side of body 50 faces the open end of cylinder 30 to minimize height requirements for housing 18. The concave side of body 50 also has a semi-cylindrical seat 54 that is parallel to pivot axis 38 and that is located near the center of cylinder 30.

Subassembly 24 further includes a pivot arm 56 that has a ball 58 at one end that engages ball socket 35 of piston 32 and a cylindrical nose 60 at an opposite end that engages seat 54 of lever arm 44 as best shown in FIG. 4.

Fluid actuator 14 has a preassembled rotor unit 61 that is shown in FIG. 7. The preassembled rotor unit 61 includes a rotor 62 that is rotationally mounted in housing 20 by the hinged stop sign 12 for rotation about an axis 64 that is parallel to axis 38 as best shown in FIG. 3 and explained below. Rotor 62 has a spool 66 at each end. Each spool 66 has an outer flange 67 with a flat 69 and a plurality of axially oriented, open ended cavities 71 including a unique cavity 71a which cooperates with a preload spring clip 100 as explained below.

Rotor 62 further includes an eccentric arm 68 between the spools 66 at the respective ends of the rotor. Eccentric arm 68 engages lip 52 of lever arm 44. Thus rotor 62 is rotated substantially 90 degrees from a retracted position shown in solid line to an extended position shown in phantom line in FIG. 4 when lever arm 44 is moved between these respective positions by piston 32.

A torsion spring 70 encircles each spool 66 with an inner end 72 bent into a longitudinal orientation and anchored in an open ended hole 73 in the eccentric arm 68 of rotor 66. Each torsion spring 70 has an outer end 74 bent into a radial orientation and engaging a groove 75 in the top of spring stop posts 76 that are attached to base member 28. (The outer flange 67 of each spool 66 has a flat 69 to facilitate molding of the open ended holes 73 in eccentric arm 62 for receiving the respective inner ends 72 of torsion springs 70.) Torsion springs 70 bias rotor 62 to the retracted position, that is, counterclockwise as shown in FIG. 4. This also biases lever arm 44 counterclockwise to the retracted position shown in solid line in FIG. 4 where lip 52 engages the bottom of base 20. Posts 76 are preferably an integral part of base member 28 for economy.

To facilitate assembly, subassembly 24 includes the preassembled rotor unit 61 comprising rotor 62, the torsion springs 70 and two preload spring clips 100 that are shown in detail in FIGS. 5, 7 and 8. Each pre-load spring clip 100 comprises a generally U-shaped body 102 having a mounting leg 104 spaced from a holding leg 106 by a bridge 108 that connects the legs 104 and 106 to each other at one end. The mounting leg 104 of each pre-load spring clip 100 includes an outwardly projecting pin 110 and is shaped to correspond to the unique, axially oriented, open ended cavity 71a in each spool 66. Mounting legs 104 fit snugly in cavities 71a of the spools 66 to support the two pre-load spring clip 100 at the opposite ends of rotor 62 with the holding legs 106 engaging the outer radial ends 74 of the respective torsion springs 70 as best shown in FIG. 7. The preload spring clips 100 preload the torsion springs 70 and form the preassembled rotor unit 61 which facilitates assembly of the rotor 62 and preloaded torsion springs 70 into the subassembly 24 and ultimately into housing 18. Pins 110 insure that the pre-load spring clips 100 are properly located in the unique cavities 71a and also provide a visual signal that the preload spring clip 100 are indeed properly located.

Figure 2:
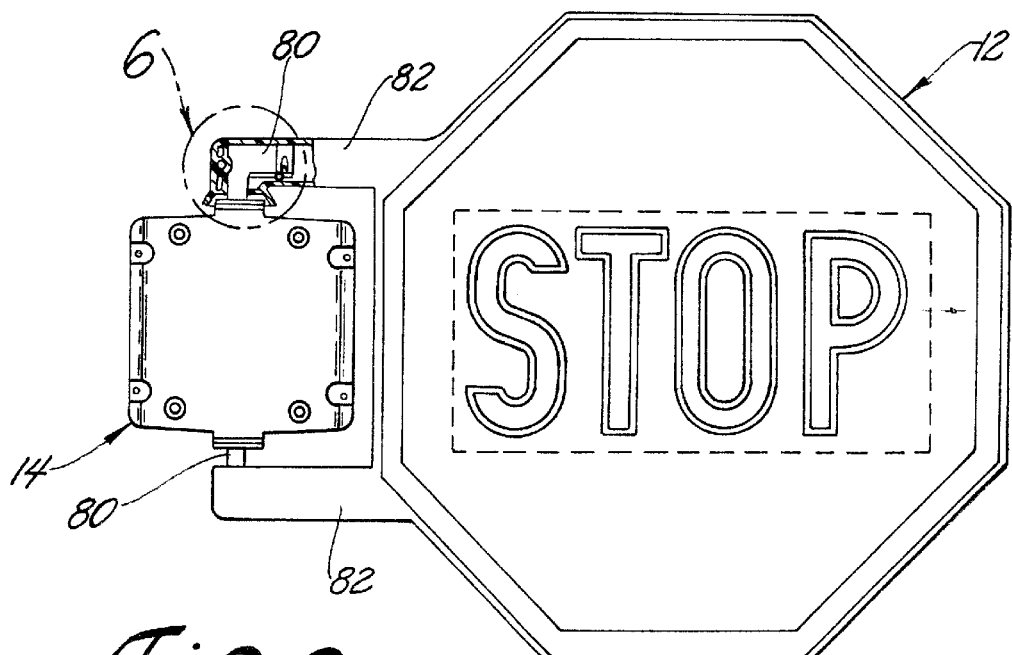
FIG. 2 is a front view of the hinged stop sign and the fluid actuator that is shown in FIG. 1.

Stop sign 12 mounts rotor 62 rotationally in housing 18 by means of two hollow L-shaped arms 80 that are shown and described in detail in U.S. Pat. Nos. 5,687,500 and 5,796,331 granted to Ronald C. Lamparter Nov. 18, 1997 and Aug. 18, 1998 respectively. As shown in FIGS. 2, 3 and 6, the L-shaped arms 80 are mounted in the hollow ends of vertically spaced hinge members 82 of stop sign 12 with a vertical leg 84 that protrudes through a hole of the respective hinge member 82 and extends inwardly. Each vertical leg 84 has a flange 86, a round portion 88 outwardly of the flange, and a reduced end portion that is not round, such as the hexagonal end portion 90 as best shown in FIG. 6. Each round portion 88 rides in a flanged brass collar 92 while each hexagonal end portion 90 fits into a correspondingly shaped, concentric recess 93 in the end of a respective spool 66 of rotor 62.

Base 20 and cover 22 each have two semicircular recesses opposite each other in their respective side walls that form two round holes for supporting the flanged brass collars 92 when the cover 22 is attached to base 20. The brass collars 20 are cradled and held in the recesses of the base 20 by the recesses of the cover 22. The cover 22 thus acts in the manner of a bearing cap so that the brass collars 92 can be seated in the cradles of base 20 when the cover 22 is removed for installation of sub-assembly 24. Brass collars 92 are then held in place when cover 22 is attached which completes the rotational mounting of rotor 62 in housing 18.

In order to protect the interior of sealed housing 18 against the intrusion of water, snow, ice and other deleterious matter into the housing 18 via the upper round hole for the upper brass collar 92 and L-shaped arm 80, the upper hinge member 82 of stop sign 12 preferably has a flared annular skirt 96 that covers the hole and the flanges of upper brass collar 92 and arm 80 like an umbrella.

The fluid actuator 14 operates in the following manner. When bus 10 stops to pick-up or discharge passengers fluid, preferably air, under pressure from source 98 is admitted into chamber 33 via a fluid control valve 100 and passage 34. Fluid power sources and fluid control valves are well known and thus need not be shown or described in detail. Thus fluid power source 98 and fluid control valve 100 are merely shown schematically in FIG. 4. As pressurized fluid is admitted into chamber 33, chamber 33 expands pushing piston 32 outwardly. Piston 32 in turn pivots lever 44 clockwise from the retracted position shown in solid line in FIG. 4 to the extended position shown in phantom. Lever 44 in turn pivots rotor 92 clockwise substantially 90° from the solid line retracted position to the phantom line extended position. Stop sign 12 being attached to rotor 92, swing substantially 90° from a stored position adjacent side wall 16 of bus 10 to an extended or operative position substantially perpendicular to the side wall. It should be noted that arm 68 is spaced from cover 22 when sign 12 is in the extended position. This allows sign 12 to travel past the extended perpendicular position without damaging actuator 14 in case sign 12 pushed past the extended position. After the passengers have been taken on or discharged, fluid control valve 100 is operated to exhaust chamber 33, and piston 32 is retracted by torsion springs 74 which also retracts stop sign 12, rotor 92 and lever 44 to their respective retracted positions.

While the invention has been illustrated and described in detail in connection with a hinged stop sign 12, the fluid actuator 14 can also be used for other hinged safety devices such as a hinged crossing arm assembly 112 that is shown in FIG. 1. Such crossing arm assemblies are well known and are pivoted substantially 90° from a retracted position against the front bumper of the bus 10 to an extended position substantially perpendicular to the bumper. Moreover, while the fluid actuator 14 is preferably operated by pressurized air which is clean cheap and easy to handle, the fluid actuator 14 may be operated by any gas, by vacuum or even by liquids such as hydraulic fluid or oil, with the proper well known modifications.

In other words, many modifications and variations of the present invention are possible in light of the above teachings. It is therefore, to be understood that, within the scope of the appended claims, the invention may be practiced otherwise than as specifically described.

We claim:

1. A fluid actuator for attaching a hinged safety device to a vehicle and pivoting the hinged safety device between retracted and extended positions comprising:

a housing having a fluid motor attached to the housing,
a lever arm pivotally attached to the housing for pivotal movement about a pivot axis between retracted and extended positions, the lever arm being moveable by the fluid motor between the retracted and extended position, and
a rotor unit comprising a rotor, a spring and a preload spring clip;
the rotor being rotationally mounted in the housing for movement between retracted and extended positions, the rotor having an eccentric arm;
the spring having one end engaging the rotor and an opposite end engaging a stop in the housing so that the eccentric arm is biased toward its retracted position and biases the lever arm toward its retracted position, and
the preload spring clip preloading the spring to facilitates assembly of the rotor and the spring into the housing.

2. The fluid actuator as defined in claim 1 wherein the spring is preloaded by the preload spring clip in the rotor unit.

3. The fluid actuator as defined in claim 2 wherein the spring is a torsion spring that encircles a spool of the rotor and the eccentric arm engages the lever arm to bias the lever arm to its retracted position.

4. The fluid actuator as defined in claim 3 wherein the preload spring clip comprises a generally U-shaped body having a mounting leg spaced from a holding leg by a bridge that connects the mounting leg and the holding leg to each other, the mounting leg being disposed in an open ended cavity in the spool to support the preload clip, and the holding leg engaging the opposite end of the torsion spring to preload the torsion spring and facilitate assembly of the rotor and torsion spring into the housing.

5. The fluid actuator as defined in claim 4 wherein the rotor has a plurality of opened ended cavities including a unique open ended cavity that receives the mounting leg of the spring clip which is shaped to fit in the unique open ended cavity.

6. The fluid actuator as defined in claim 5 wherein the one end of the torsion spring is longitudinal and disposed in an opened ended hole in the eccentric arm and the opposite end of the torsion spring is radial.

7. A fluid actuator for attaching a hinged safety device to a vehicle and pivoting the hinged safety device between retracted and extended positions comprising:

a housing having a fluid motor attached to the housing,
a lever arm pivotally attached to the housing for pivotal movement about a pivot axis between retracted and extended positions, the lever arm being moveable by the fluid motor between the retracted and extended position, and
a rotor unit comprising a rotor, torsion springs and preload spring clips,
the rotor being rotationally mounted in the housing for movement between retracted and extended positions,
the rotor having a spool at each end and an eccentric arm between the spools at the respective ends of the rotor,
one of the torsion springs encircling each spool with one end engaging the rotor and an opposite end engaging a stop so that the eccentric arm is biased toward its retracted position and biases the lever arm toward its retracted position, and
one of the preload spring clips preloading each of the torsion springs to facilitate assembly of the rotor and the torsion springs into the housing.

8. The fluid actuator as defined in claim 7 wherein the torsion springs are preloaded by the preload spring clips in the rotor unit.

9. The fluid actuator as defined in claim 8 wherein the pre-load spring clips each comprise a generally U-shaped body having a mounting leg spaced from a holding leg by a bridge that connects the mounting leg and the holding leg to each other, the mounting leg being disposed in an open ended cavity in one of the spools to support the pre-load clip, and the holding leg engaging the opposite end of the one of the torsion springs to preload the one of the torsion springs and facilitate assembly of the rotor and torsion springs into the housing.

10. The fluid actuator as defined in claim 9 wherein the rotor has a plurality of opened ended cavities in each end including a unique open ended cavity in each end that receives the mounting leg of one of the spring clips which is shaped to fit in the unique open ended cavity.

11. The fluid actuator as defined in claim 10 wherein the one end of each torsion spring is longitudinal and disposed in an opened ended hole in the eccentric arm and the opposite end of each torsion spring is radial.

* * * * *

UNITED STATES PATENT AND TRADEMARK OFFICE
CERTIFICATE OF CORRECTION

PATENT NO. : 6,705,206 B1
DATED : March 16, 2004
INVENTOR(S) : Edward Bernard et al.

It is certified that error appears in the above-identified patent and that said Letters Patent is hereby corrected as shown below:

<u>Title page,</u>
Item [57], ABSTRACT, should read as follows:
-- A fluid actuator attaches a hinged safety device to a vehicle and pivots the hinged safety device between retracted and extended positions. A lever arm transfers motion to a rotor that is rotationally mounted in a housing for movement between the retracted and extended positions. The rotor has a spool at each end and an eccentric arm between the spools at the respective ends of the rotor that engages the lip of the lever arm. A torsion spring encircles each spool with one end engaging the rotor and an opposite end engaging a stop post so that the eccentric arm is biased against the lip of the lever arm and the rotor and the lever arm are biased to their respective retraced positions. The rotor and torsion springs are formed into a pre-assembled unit for the sub-assembly by preload spring clips. --

<u>Column 1,</u>
Line 6, after "relates" insert -- to --

<u>Column 2,</u>
Line 19, after "easier" delete "that" and insert -- than --
Line 37, after "enlarged" delete "from" and insert -- front --
Line 57, after "stop sign" delete "14" and insert -- 12 --

<u>Column 5,</u>
Line 26, after "rotor 92" delete "swing" and insert -- swings --
Line 34, after "sign 12" insert -- is --

<u>Column 6,</u>
Line 14, after "spring to" delete "facilitates" and insert -- faciliatate --
Line 33, after "of" delete "opened" and insert -- open --
Line 39, after "an" delete "opened" and insert -- open --

UNITED STATES PATENT AND TRADEMARK OFFICE
CERTIFICATE OF CORRECTION

PATENT NO. : 6,705,206 B1
DATED : March 16, 2004
INVENTOR(S) : Edward Bernard et al.

It is certified that error appears in the above-identified patent and that said Letters Patent is hereby corrected as shown below:

Column 8,
Line 8, after "in an" delete "opened" and insert -- open --

Signed and Sealed this

Twenty-fifth Day of May, 2004

JON W. DUDAS
*Acting Director of the United States Patent and Trademark Office*